United States Patent [19]

Katsuno

[11] Patent Number: 4,582,162
[45] Date of Patent: Apr. 15, 1986

[54] AUTOMOBILE SPEAKER UNIT

[75] Inventor: Akira Katsuno, Tokyo, Japan

[73] Assignee: Pioneer Electronic Corporation, Tokyo, Japan

[21] Appl. No.: 681,050

[22] Filed: Dec. 13, 1984

[30] Foreign Application Priority Data

Dec. 13, 1983 [JP] Japan .......................... 58-192454[U]

[51] Int. Cl.⁴ ............................................. H05K 5/00
[52] U.S. Cl. ..................................... 181/141; 181/144; 181/150; 381/86
[58] Field of Search ............... 181/141, 144, 145, 150, 181/155; 381/86; 179/146 E

[56] References Cited

U.S. PATENT DOCUMENTS

| | | | |
|---|---|---|---|
| 3,595,337 | 7/1971 | Furey et al. | 181/155 |
| 3,993,345 | 11/1976 | Croup | 181/150 X |
| 4,323,138 | 4/1982 | Horner | 181/150 X |
| 4,451,928 | 5/1984 | Murayama | 381/86 |
| 4,502,149 | 2/1985 | Gefvert | 381/86 |

Primary Examiner—Benjamin R. Fuller
Attorney, Agent, or Firm—Sughrue, Mion, Zinn, Macpeak and Seas

[57] ABSTRACT

A speaker unit intended for mounting on the rear deck panel of a hatchback automobile which provides easy mounting of two speakers with a fixed predetermined distance therebetween. The two speakers are fixed to a front grille which covers their front portions but which does not extend sufficiently high to obstruct the driver's vision to the rear of the vehicle. Each of the speakers extends through an aperture through the rear deck panel. A single enclosure is mounted below the speakers, fixed to the grille frame with screws or the like. Guide portions integral with the enclosure and which mate with the rear ends of the speakers determine the relative positions of the speakers, grille frame and enclosure.

4 Claims, 8 Drawing Figures

AUTOMOBILE SPEAKER UNIT

BACKGROUND OF THE INVENTION

The invention relates to an automotive speaker unit. More particularly, the invention relates to a speaker unit intended for mounting on the rear deck panel of a hatchback-type automobile.

Two types of speaker units of this type have been conventionally known. A first type is the box-type speaker unit in which the individual speakers are mounted in box-like enclosures and the enclosures mounted on top of the rear deck. A second type is the flush-mounting type in which a top grille is mounted substantially flush with the upper surface of the rear deck and the speakers themselves are mounted below the deck panel.

The first type is disadvantageous in that it tends to block the driver's field of vision to the rear of the vehicle. The second type is also disadvantageous in that the lower sides of the speakers are uncovered, making it easy for them to be damaged. Further, the mounting bolts for the speakers often pose a hazard in that, when loading and unloading the compartment below the rear deck panel, it is easy to snag objects on these bolts. Moreover, both types of speaker units have further shortcomings, including difficulties in positioning the speakers relative to one another and the danger of damage to the exposed wiring of the speakers. Still further, the strength of the rear deck panel is often insufficient to properly support the speaker units.

SUMMARY OF THE INVENTION

Accordingly, an object of the present invention is to provide a speaker unit suitable for mounting on the rear deck panel of a hatchback vehicle which is free from all of the above-noted defects, specifically, a speaker unit of this type which does not impede the rearward vision of the driver and which provides adequate protection for the speakers and their connecting wires as well as to objects being loaded into or taken out of the compartment below the rear deck panel.

In accordance with the above and other objects, the invention provides a speaker unit adapted for mounting on the rear deck panel of a hatchback vehicle including a grille frame for holding the speakers and covering their front portions and an enclosure coupled to the grille frame with the rear deck panel therebetween, the enclosure covering the rears of the speakers. The enclosure is provided with guide members serving to position the grille frame relative to the enclosure by engagement with the rear portions of the speakers.

DESCRIPTION OF THE PREFERRED EMBODIMENTS

Figure 1:
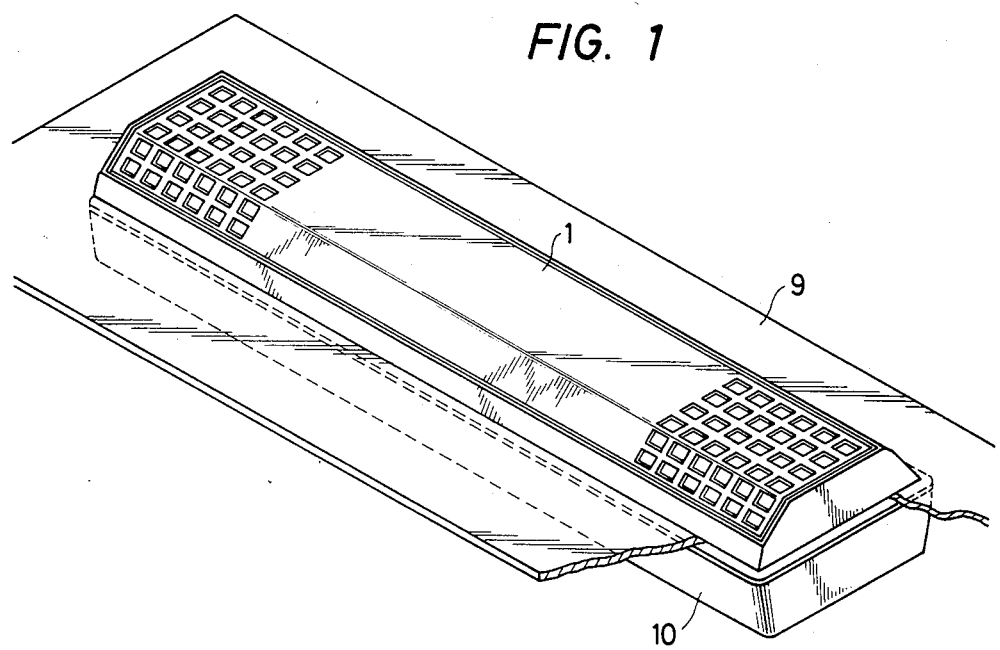
FIG. 1 is a perspective view of a speaker unit constructed in accordance with a preferred embodiment of the invention.

Referring to the drawings, a preferred embodiment of a speaker unit of the invention will be discussed in detail.

Figure 2:
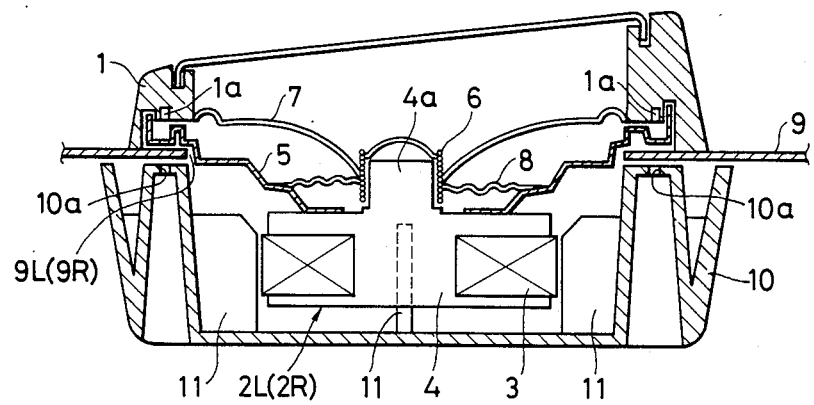
FIG. 2 depicts a transverse cross section of the speaker unit of FIG. 1.
Figure 3:
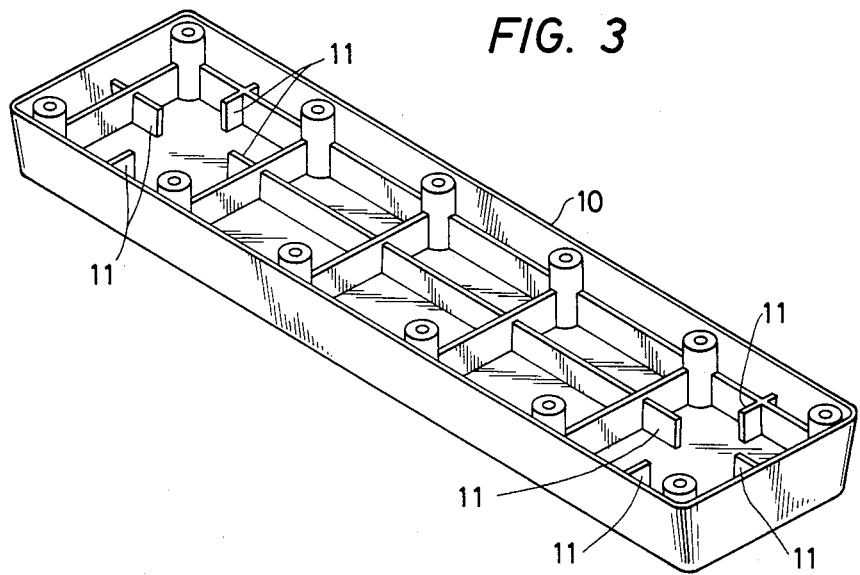
FIG. 3 is a perspective view illustrating the internal construction of the speaker unit of FIG. 1.

As seen in the perspective view of FIG. 1 and the cross-sectional view of FIG. 2, a pair of left and right speakers 2L and 2R are fixed to a grille frame 1 a predetermined distance apart. The front portions of both speakers 2L and 2R are covered by the grille frame 1. With specific reference to FIG. 2, The speakers 2L and 2R each include a toroidal magnet 3, a yoke 4 forming a magnetic circuit with the magnet 3, a frame 5 joined along an inner periphery to the yoke 4 and along an outer periphery to the grille frame 1 with screws or the like, a voice coil 6 which moves parallel to a pole piece 4a of the yoke 4 when a driving signal is applied thereto, a diaphragm 7 which vibrates in response to movement of the voice coil 6, and a damper 8 which regulates the movement of the voice coil 6. The speakers 2L and 2R extend through apertures 9L and 9R, respectively, formed in the rear deck panel a predetermined distance apart.

Reference numeral 10 indicates an enclosure which encloses the rears of the speakers 2L and 2R, that is, the magnetic circuit portions of the speakers 2L and 2R. The rear deck panel 9 is sandwiched along the edges of its apertures 9L and 9R between the enclosure 10 and the grille frame 1. The enclosure 10 is fixed to the grille frame 1 at about a dozen points along their peripheral portions with screws. For this purpose, screw holes 1a and 10a are formed in the grille frame 1 and the enclosure 10, respectively.

Figure 4:
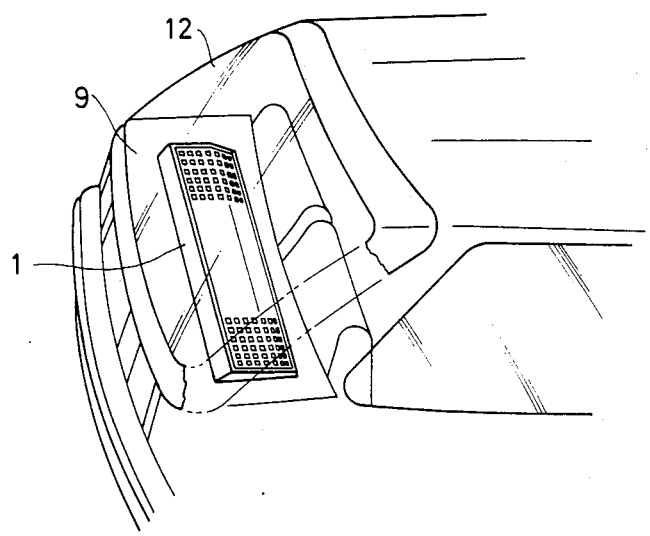
FIGS. 4 and 5 are rear perspective views of a hatchback automobile equipped with a speaker unit of the invention.

As shown in FIG. 4, guide plates 11, formed integrally with the grille frame 1, are provided to position the grille frame 1 relative to the enclosure 10 by engagement with the rear portions of the speakers 2L and 2R, that is, with the outer surfaces of the magnets 3. Correct relative positioning of the grille frame 1 and the enclosure 10 is thus automatically carried out when they are mounted joined together during the mounting operation. Further, it is preferred that a separator be provided between the two speakers 2L and 2R in the enclosure 10 to improve the separation therebetween.

Figure 5:
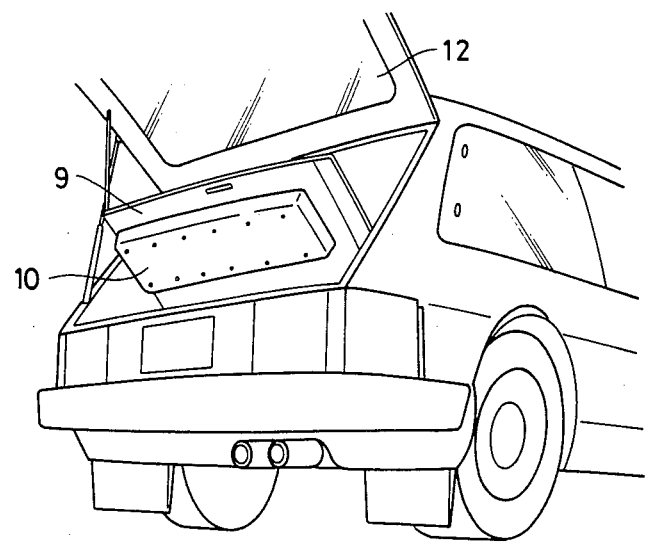

As may be appreciated from the views of FIGS. 4 and 5, the above-described speaker unit of the invention when mounted on the rear deck panel of an automobile actually serves to reinforce the rear deck panel in strength, besides firmly mounting the speakers. Moreover, because the overall height of the unit above the rear deck panel inside the passenger compartment of the vehicle is reduced relative to the conventional box-type speaker unit, the driver's field of vision is improved. Further, the enclosure serves to prevent damage to the speakers themselves and to their wiring, and also prevents objects from being snagged on the mounting bolts of the speakers. Yet further, with the invention, the speakers are always mounted with a correct spacing, and the mounting operation of the speakers is quite easy.

Figure 6A:
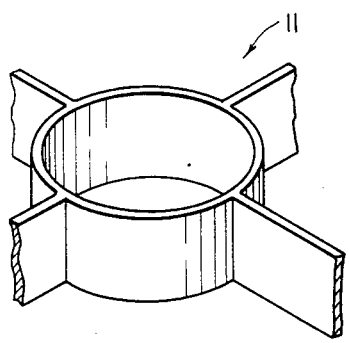
FIGS. 6A and 6B are schematic perspective views of guide members shown in FIG. 3.
Figure 6B:
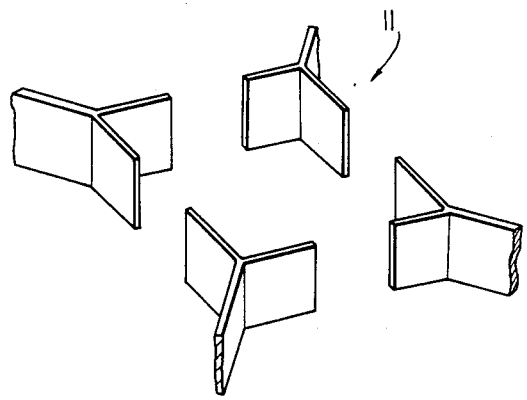

In modifications of the embodiment described above, guide members as shown in either of FIG. 6A or 6B may be employed.

Figure 7:
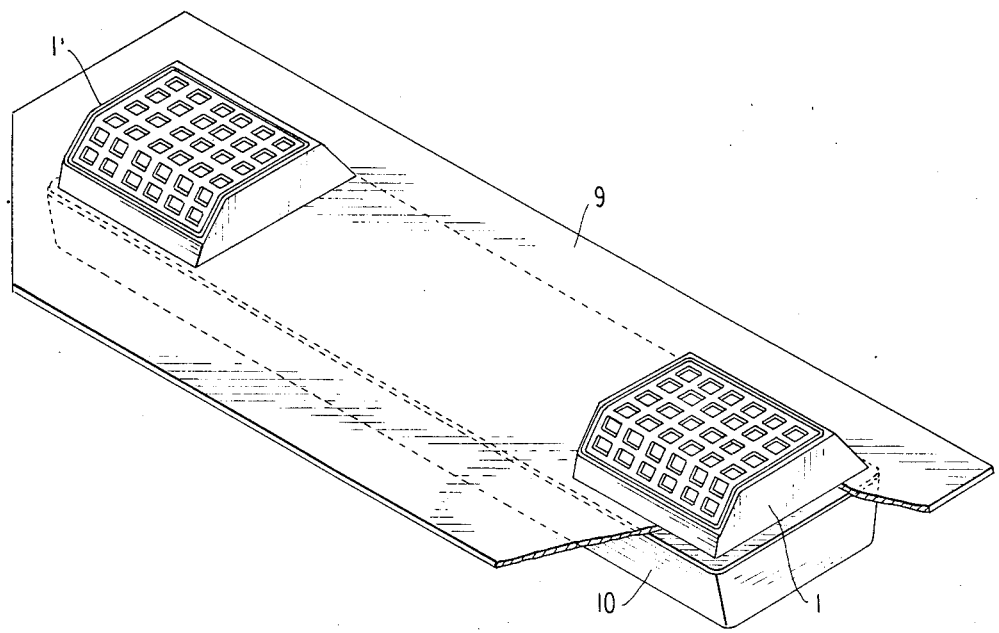
FIG. 7 is a perspective view of an alternate speaker unit construction.

Furthermore, although in the embodiment described above there are two speakers and a single grille frame and single enclosure, other arrangements can be contemplated as well. For instance, it is possible within the scope of the invention to provide two speakers with separate grille frames 1, 1' but with a single enclosure 10, as shown in FIG. 7.

This completes the description of the preferred embodiments of the invention. Although preferred embodiments have been described, it is believed that numerous modifications and alterations thereto would be apparent to one of ordinary skill in the art without departing from the spirit or scope of the invention.

I claim:

1. An automotive speaker unit for mounting on a rear deck panel of a hatchback vehicle, comprising: at least one speaker; at least one speaker frame for supporting said at least one speaker; a grille frame for holding said speaker frame such that an outer periphery of said speaker frame is fixedly secured to said grille frame and covering front portions of said speaker; and an enclosure coupled to said grille frame with portions of said rear-deck panel sandwiched therebetween, a central portion of said speaker frame and a rear portion of said speaker extending through a corresponding aperture formed in said rear deck panel, said enclosure including guide members for engaging with said rear portion of said speaker for determining a position of said speaker and said grille frame relative to said enclosure and said grille frame and said enclosure being coupled together on opposite sides of said rear deck panel by fastener means.

2. The automotive speaker unit of claim 1, wherein there are provided two speakers and a single enclosure.

3. The automotive speaker unit of claim 1, wherein there are provided two speakers, two corresponding grille frames and a single enclosure, said grille frames being arranged a predetermined distance apart on said rear deck panel.

4. The automotive speaker unit of claim 1, wherein said members are integral with said enclosure.

* * * * *